US006634775B2

United States Patent
Nagai

(10) Patent No.: US 6,634,775 B2
(45) Date of Patent: Oct. 21, 2003

(54) WIRE CONNECTING STRUCTURE OF LAMP UNIT

(75) Inventor: Kentaro Nagai, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 31 days.

(21) Appl. No.: 09/945,746

(22) Filed: Sep. 5, 2001

(65) Prior Publication Data

US 2002/0027783 A1 Mar. 7, 2002

(30) Foreign Application Priority Data

Sep. 5, 2000 (JP) ................................... P.2000-268936

(51) Int. Cl.[7] ............................. B60Q 1/00; B60Q 1/26
(52) U.S. Cl. .................. 362/490; 362/226; 362/391; 362/549; 362/496
(58) Field of Search .............................. 362/487, 488, 362/490, 226, 391, 549, 496

(56) References Cited

U.S. PATENT DOCUMENTS

| 3,952,209 A | * | 4/1976 | Shaklee et al. | ................. | 307/9 |
| 5,558,425 A | * | 9/1996 | Pons et al. | ..................... | 362/74 |
| 5,984,495 A | * | 11/1999 | Roberts et al. | ............. | 362/490 |
| 6,283,621 B1 | * | 9/2001 | Macri | ......................... | 362/488 |

* cited by examiner

*Primary Examiner*—Stephen Husar
*Assistant Examiner*—Sharon Payne
(74) *Attorney, Agent, or Firm*—Sughrue Mion, PLLC

(57) ABSTRACT

When an interior lamp (10) is mounted in a lamp mounting window (41) in a roof trim (40), press-connecting terminals (25a) of bus bars (25), mounted on a lower surface of a switch unit (20), are disposed on a lower surface of an insulating housing (24), and the electrically-connecting portions, electrically connected to an FFC (30), are disposed on the interior-side of the switch unit (20) directed toward the interior.

5 Claims, 6 Drawing Sheets

WIRE CONNECTING STRUCTURE OF LAMP UNIT

BACKGROUND OF THE INVENTION

1. Technical Field of the Invention

This invention relates to a wire connecting structure of a lamp unit, and more particularly to an improvement of the wire connecting structure of the lamp unit mounted in a lamp mounting window formed in an interior wall member covering a vehicle body panel.

2. Related Art

When a lamp unit (such as an interior lamp and a courtesy lamp) is mounted on an interior wall member (such as a roof trim and a door trim) covering a vehicle body panel, the lamp unit is mounted in a lamp mounting window formed in the interior wall member.

An interior lamp 70, shown in FIGS. 6 and 7, is a lamp unit mounted in a lamp mounting window 78a formed in a roof trim 78 covering a body roof (vehicle body panel) 77.

The interior lamp 70 mainly comprises a lamp housing 73, a bulb (electric bulb) 71, and a cover lens 79. After the bulb 71 is attached to a lamp mounting portion of the lamp housing 73, the cover lens 79 is attached to the lamp housing 73. A connection terminal 76 of bus bars, mounted in the lamp housing 73, are provided on a vehicle body panel-side (upper side in the drawings) of the interior lamp 70 as a wire connection portion.

For mounting the above interior lamp 70 on the roof trim 78, a connector 75 of a roof harness 74, beforehand installed on the body roof 77, is once drawn downwardly through the lamp mounting window 78a in the roof trim 78, and then this connector is fitted and connected to the connection terminal portion 76 of the interior lamp 70. Thereafter, the roof harness 74 is brought back through the lamp mounting window 78a, and is again located on the roof trim 78, and then the interior lamp 70 is fixed to the lamp mounting window 78a.

In the above related lamp unit 70, the connection terminal portion 76, to which the connector 75 of the roof harness 74 is adapted to be fitted and connected, are directed toward the body roof 77.

Therefore, when dew condensation develops on an interior-side of the body roof 77 due to the temperature difference between the inside and outside of the passenger interior, there is a fear that water droplets 80, developing on the interior-side of the body roof 77, drop onto the connection of the connector 75 and the connection terminal portions 76 as shown in FIG. 7, and this invites a possibility that the water droplet 80, having dropped on the electrically-connecting portions, causes the short-circuiting or the like.

SUMMARY OF THE INVENTION

It is therefore an object of this invention to solve the above problem, and more specifically to provide a good wire connecting structure of a lamp unit in which wire connection portions of the lamp unit will not be short-circuited by dew condensation developing inside a body panel.

The above object of the present invention is achieved by a wire connection structure for a lamp unit mounted in a lamp mounting window formed in an interior wall member covering a vehicle body panel, wherein a wire connection portion of the lamp unit adapted to be electrically connected to wires installed on a vehicle body panel-side of said interior wall member are provided on an interior-side of said lamp unit.

In this construction, even when dew condensation develops on the interior-side of the body panel because of the temperature difference between the inside and outside of the passenger interior, so that water droplets due to the dew condensation drop from the body panel toward the interior, the water droplets will not fall on the wire connection portions of the lamp unit, thus preventing the short-circuiting due to the dew condensation, since the wire connection portions of the lamp unit are disposed on the interior-side of the lamp unit directed toward the interior.

DETAILED DESCRIPTION OF PREFERRED EMBODIMENT

One preferred embodiment of the present invention will now be described in detail with reference to the accompanying drawings.

Figure 1:
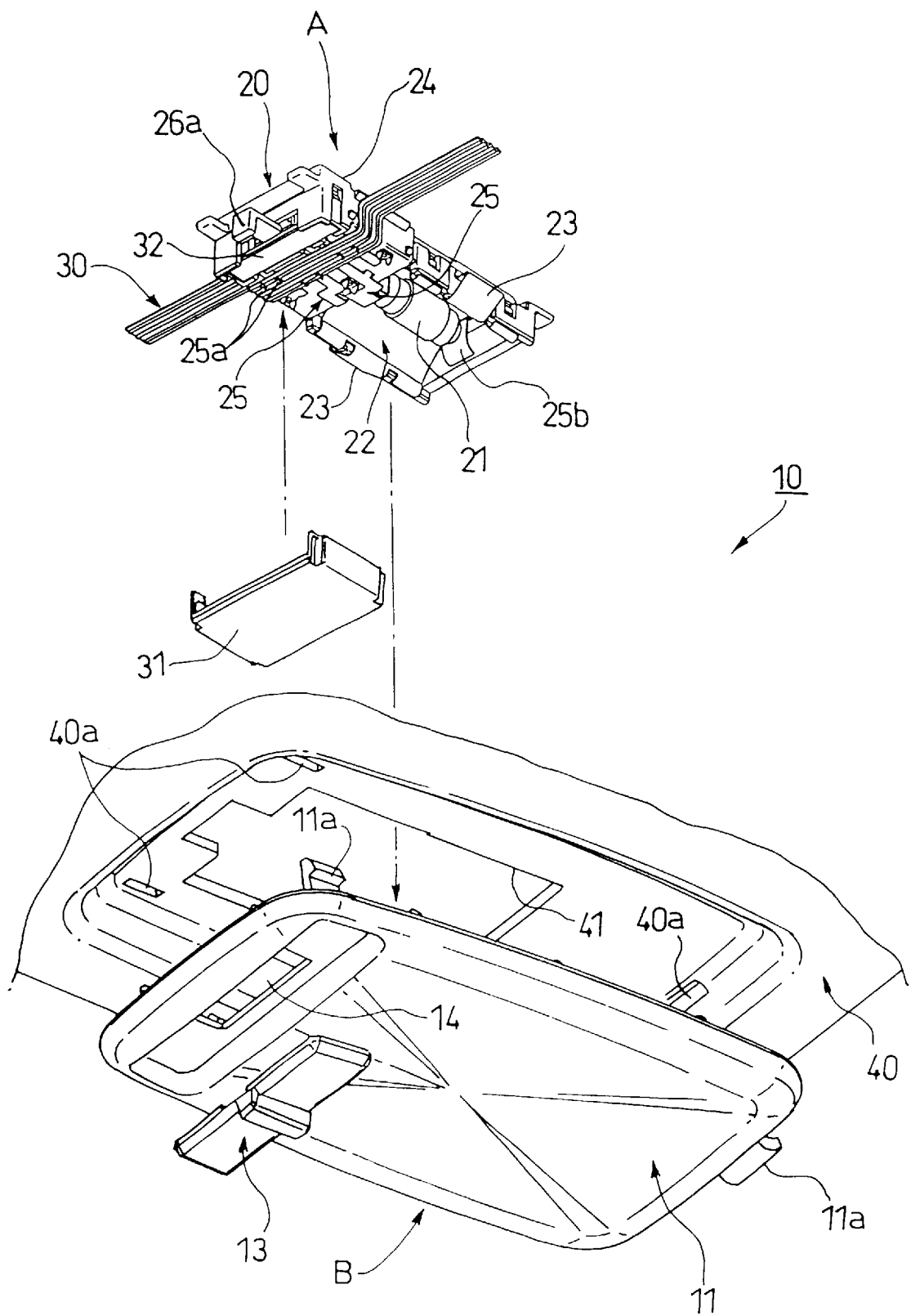
FIG. 1 is a perspective view of an important portion of one embodiment of a lamp unit of the invention, showing the process of mounting the lamp unit on a roof trim.
Figure 2:
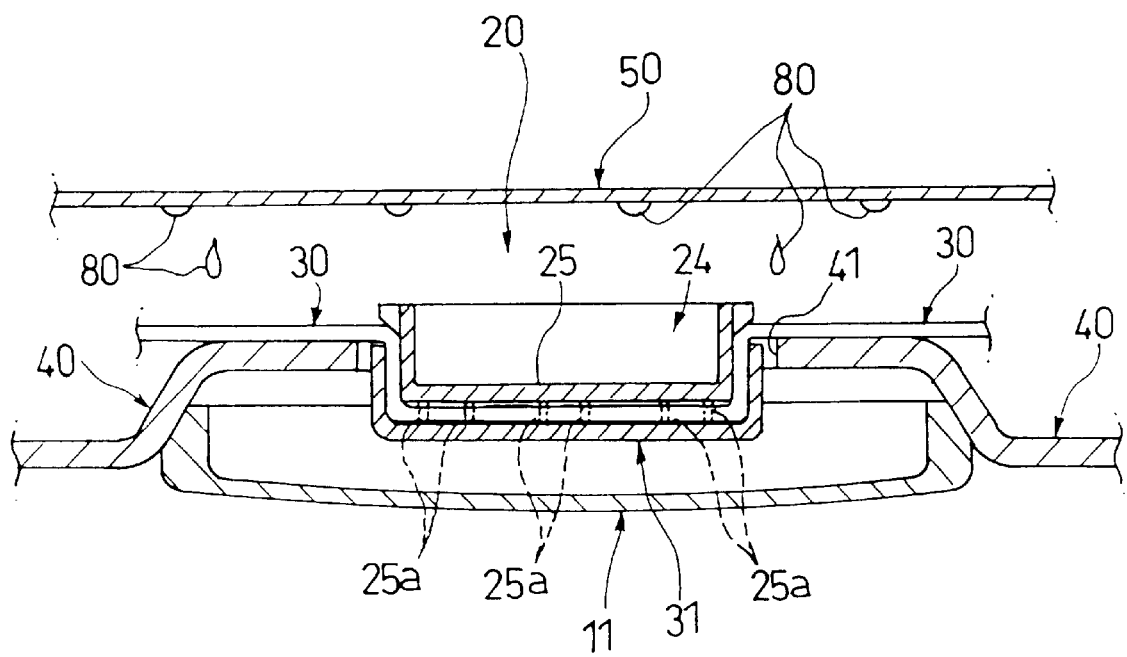
FIG. 2 is a transverse cross-sectional view of the lamp unit of FIG. 1 mounted on the roof trim.
Figure 3:
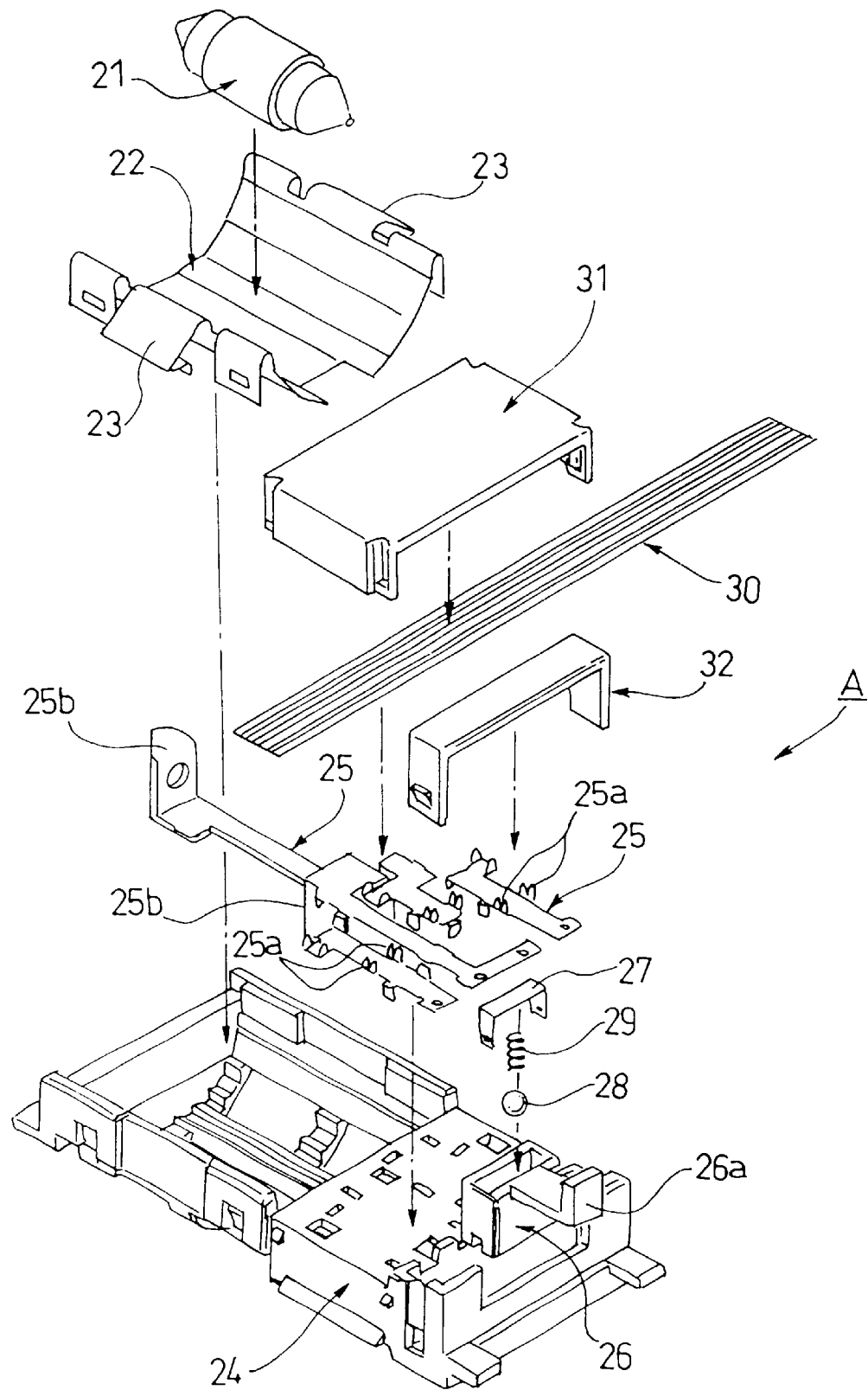
FIG. 3 is an exploded, perspective view of a lamp function portion of FIG. 1.
Figure 4:
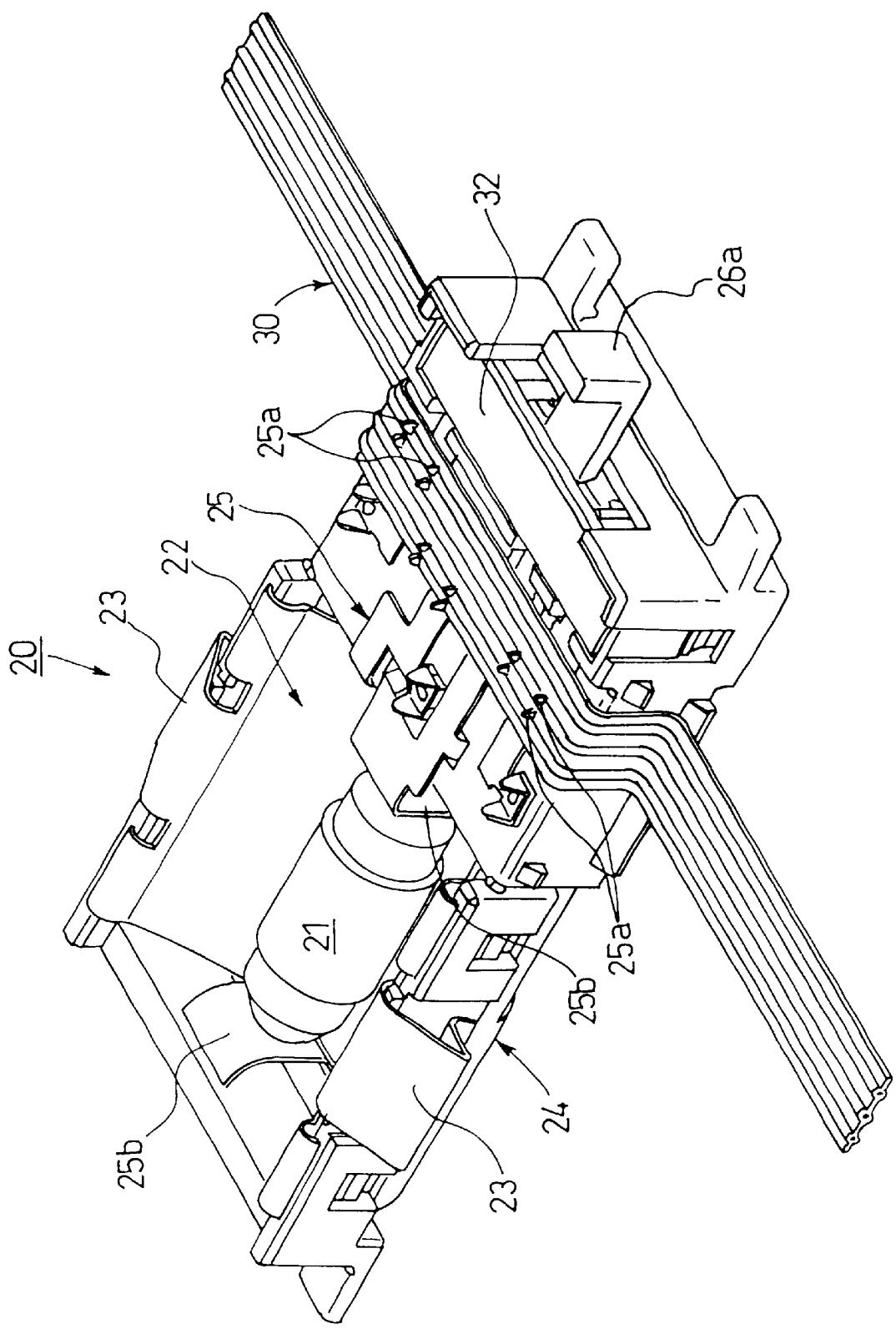
FIG. 4 is a perspective view showing the lamp function portion of FIG. 3 in its assembled condition.

FIG. 1 is a perspective view of a substantial part of one embodiment of a lamp unit of the invention, showing the process of mounting the lamp unit on a roof trim. FIG. 2 is a transverse cross-sectional view of the lamp unit of FIG. 1 mounted on the roof trim. FIG. 3 is an exploded, perspective view of a lamp function portion of FIG. 1. FIG. 4 is a perspective view showing the lamp function portion of FIG. 3 in its assembled condition.

An interior lamp 10 of this embodiment, shown in FIG. 1, is a lamp unit which is to be mounted in a lamp mounting window 41 formed in the roof trim 40 (serving as an interior wall member) covering a vehicle body panel (not shown).

As shown in FIGS. 1 to 4, the interior lamp 10 is the lamp unit which comprises the lamp function portion A to be mounted on a vehicle body panel-side of the roof trim 40, and a design portion B to be mounted on an interior-side of the roof trim 40. The lamp function portion A comprises a switch unit 20 having bus bars 25 forming a switching circuit member and switch constituent parts, a bulb (electric bulb) 21 mounted between bulb contacts 25b and 25b of the bus bars 25, and a reflector 22. The design portion B comprises a cover lens 11.

The reflector 22 is a reflective member of an integral construction formed from a sheet of metal (e.g. stainless steel) by pressing or the like, and this reflector has the function of effecting the optimum luminous distribution of the bulb 21, and also functions as a structure support member for the lamp function portion A.

A pair of trim mounting portions 23 and 23 for engaging with the lamp mounting window 41 in the roof trim 40 are formed in a bent manner at lower edges of opposite side walls of the reflector 22, respectively.

As shown in FIG. 3, in the switch unit, the bus bars 25 forming the switching circuit member connected to the two bulb contacts 25b and 25b are mounted on a lower surface (interior-side surface) of an insulating housing 24. A plurality of press-connecting terminals 25a serve as wire connection portions of the bus bars 25, are formed in the bus, and project from the lower surface of the insulating housing 24.

The press-connecting terminals 25a are mounted on the lower surface of the insulating housing 24 in such a manner that pairs of press-connecting blades are directed in the same direction, and a re disposed parallel to one another. An FFC (flexible flat cable) 30 as wires forming a roof harness beforehand installed on the roof trim 40, is press-connected to the press-connecting terminals 25a. The FFC 30, press-connected to the press-connecting terminals 25a, is covered with a strain relief cover 31 serving as wire fixing member.

Further, switch parts for activating and deactivating a switching circuit are provided on the lower surface of the insulating housing 24, and the bulb 21 can be turned on and off by this switching circuit. These switch parts include a slider body 26 having an integral switch lever 26a, a contact 27, a ball 28, and a coil spring 29. By clicking the slider body 26, the switching circuit can be activated and deactivated through the contact 27, the ball 28 and the coil spring 29. These switch parts are slidably held by a cover 32.

Simultaneously when the switch unit 20 and the reflector 22 are combined together in an integrated manner, the FFC 30 is press-connected to the terminals, and then the bulb 21 is inserted between the opposed two bulb contacts 25b and 25b. By doing so, the lamp function portion A is assembled as shown in FIG. 4.

Namely, the switch parts are mounted on the lower surface of the insulating housing 24, and the bus bars 25 are mounted on this lower surface, and the FFC 30 is press-connected to the terminals, and the reflector 22 is mounted, and then the bulb 21 is mounted. By doing so, the lamp function portion A of the lamp unit 10 of this embodiment can be assembled. Therefore, all of the elements can be mounted from the same direction (that is, from the lower side of the insulating housing 24), and therefore the automatic assemblage can be effected easily.

As shown in FIGS. 1 and 2, for forming a roof module by beforehand mounting the interior lamp 10 in the embodiment from body roof side (upper side) of the roof trim 40, facing the body roof 50, the lamp function portion A comprising the switch unit 20 connected to the predetermined portion of the FFC 30 and the reflector 22 is first mounted in the lamp mounting window 41 formed in the roof trim 40.

At this time, since the trim mounting portions 23 of the reflector 22 are resiliently engaged with those portions of the edge of the lamp mounting window 41 opposed respectively to these trim mounting portions 23, the lamp function portion A is directly mounted on the roof trim 40 without rattling, and the lamp function portion A can be easily mounted.

On the other hand, the cover lens 11 forming the design portion B of the interior lamp 10 is mounted to cover the lamp function portion A, beforehand mounted in the lamp mounting window 41, from the interior-side of the roof trim 40, as shown in FIGS. 1 and 2. More specifically, retaining projections 11a are engaged respectively in engagement holes 40a in the roof trim 40, and by dosing so, the cover lens 11 is mounted to cover the lamp mounting window 41 in the roof trim 40.

A switch knob 13 is beforehand slidably fitted in a slide groove 14 formed in the cover lens 11. When the cover lens 11 is mounted to cover the lamp mounting window 41, the switch knob 13 is engaged with a distal end of the switch lever 26a. Therefore, the slider body 26, which is integral with the switch lever 26a, is operated through this switch knob 13.

Namely, when the interior lamp 10 in the embodiment is mounted in the lamp mounting window 41 in the roof trim 40, the press-connecting terminals 25a of the bus bars 25 mounted on the lower surface of the switch unit 20 are disposed on the lower surface of the insulating housing 24, and the electrically-connecting portions electrically connected to the FFC 30 are disposed on the interior-side of the switch unit 20 directed toward the interior. Therefore the electrically-connecting portions of the press-connecting terminals 25a and the FFC 30, electrically connected together, are covered with the upper surface of the insulating housing 24.

As shown in FIG. 2, therefore, even when dew condensation develops on the interior-side of the body roof 50 due to the temperature difference between the inside and outside of the passenger interior and water droplets 80 due to the dew condensation drop from the inner surface of the body roof 50 toward the interior, the water droplets 80 do not fall on the electrically-connecting portions of the press-connecting terminals 25 and the FFC 30 electrically connected together, thereby positively preventing the short-circuiting due to the dew condensation.

The construction of the wire connecting structure of the lamp unit of the invention and also the constructions of the wires and so on are not limited to those shown in the above embodiment, and each of these can take any other suitable form within the scope of the invention.

For example, the wires installed on the interior wall member are not limited to the FFC of the above embodiment, but a flat circuit member, such as an FPC (flexible printed circuit board) and a ribbon wire, and a wire harness can be used.

Figure 5:
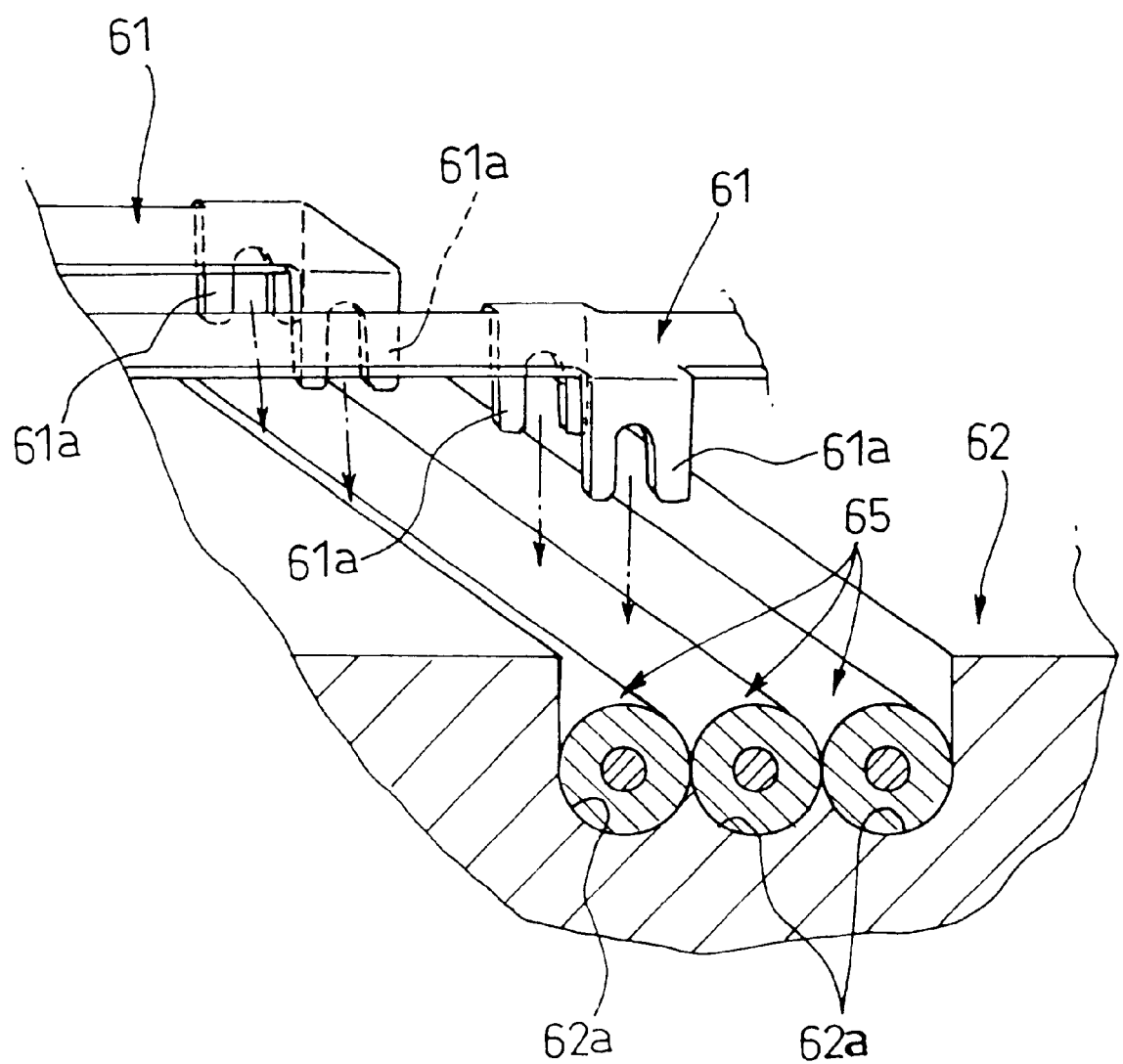
FIG. 5 is an enlarged view of an important portion showing a modified form of wire connection portions in a lamp function portion.
Figure 6:
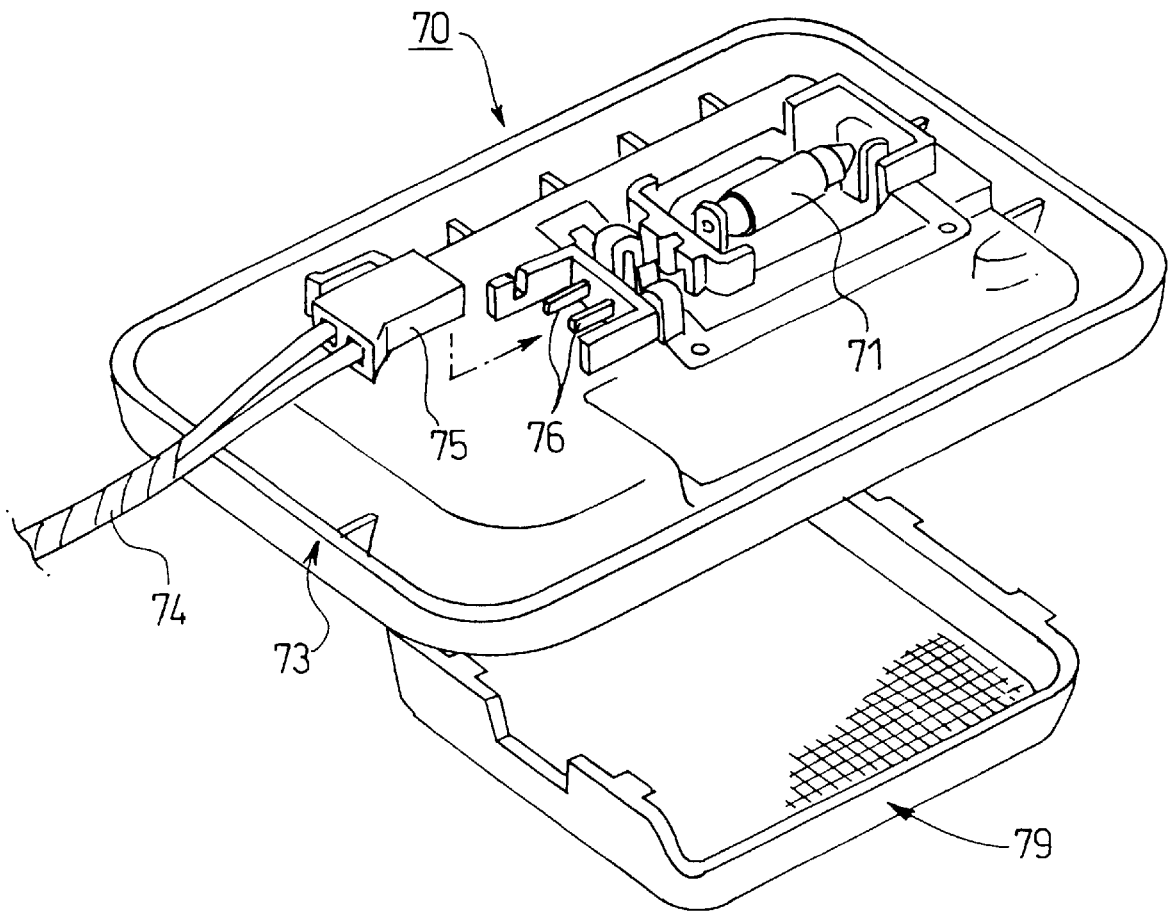
FIG. 6 is an exploded, perspective view of a related lamp unit.
Figure 7:
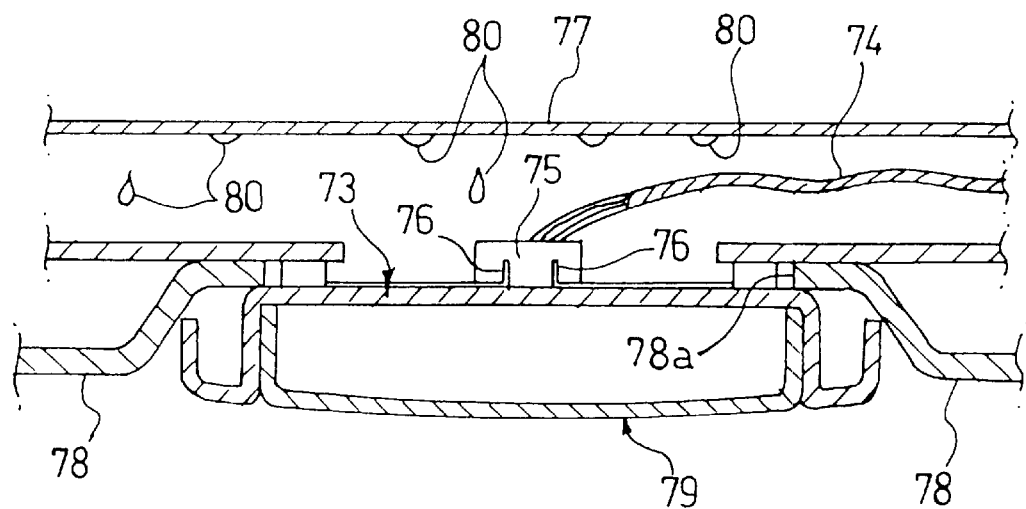
FIG. 7 is a cross-sectional view showing the lamp unit of FIG. 6 mounted on a roof trim.

In the above embodiment, the bus bars 25 forming the switching circuit member are mounted on the lower surface (interior-side surface) of the insulating housing 24, and thereafter the FFC 30 are press-connected to the press-connecting terminals 25a. However, as shown in FIG. 5, there can be used an arrangement in which a wire harness is installed on a lower surface (upper surface in FIG. 5) of an insulating housing 62 in a lamp function portion, and then bus bars 61, forming a switching circuit member, are mounted thereon, and press-connecting terminals 61a, depending from the bus bars 61, are press-connected to wires 65 of the wire harness.

In this case, wire receiving recesses 62a are formed in the lower surface of the insulating housing 62, and the wires 65 are beforehand installed in these wire receiving recesses 62a, respectively. With this construction, the wire harness can be easily installed and retained relative to the insulating housing 62, and at the same time the wire harness can be easily positioned and retained when press-connecting the press-connecting terminals 61a thereto.

In the above embodiment, although the interior lamp 10, which is the lamp unit, is mounted on the roof trim 40 serving as the interior wall member, the invention can be applied to a lamp unit such as a map lamp, mounted on the roof trim, and a courtesy lamp mounted on a door trim (interior wall member) covering a door panel.

The wire connection portions of the lamp unit are not limited to the press-connecting terminal structure of the above embodiment, but any other suitable fastening member, such as a piercing terminal structure and a welding structure, can be used.

In the above-mentioned wire connecting structure of the lamp unit of the invention, even when dew condensation develops on the interior-side of the body panel because of the temperature difference between the inside and outside of the passenger interior, so that water droplets due to the dew condensation drop from the body panel toward the interior, the water droplets will not fall on the wire connection portions of the lamp unit, thus preventing the short-circuiting due to the dew condensation, since the wire connection portions of the lamp unit are disposed on the interior-side of the lamp unit directed toward the interior.

What is claimed is:

1. A lamp unit, mounted in a lamp mounting window formed in an interior wall member covering a vehicle body panel, comprising:

a housing having an upper surface oriented toward the vehicle body panel and located on the vehicle body panel side of said wall member and a lower surface, opposite to the upper surface, having a wire connection portion located on the interior side of said wall member and adapted to be electrically connected to wires installed on a vehicle body panel side of said interior wall member, wherein:

arranging said wire connection portion on said interior side of said wall member prevents water from flowing from said vehicle body panel side of said wall member to come into contact with said wire connection portion.

2. A lamp unit for illuminating an interior of a vehicle mounted in a lamp mounting window formed in an interior wall member covering a vehicle body panel, the lamp unit comprising:

an insulating housing defining an upper surface oriented toward the vehicle body panel and located on the vehicle body panel side of said wall member; and a lower surface opposite to the upper surface;

an illumination member for illuminating the interior of the vehicle mounted on the lower surface; and a wire connection portion, for electrically connecting the illumination member to wires installed on the vehicle body panel, mounted on the lower surface so as to be located on the interior side of said wall, wherein:

arranging said wire connection portion on said interior side of said wall member prevents water from flowing from said vehicle body panel side of said wall member to come into contact with said wire connection portion.

3. The lamp unit according to claim 2, wherein the illumination member comprises a bulb and a reflector.

4. The lamp unit according to claim 2, wherein the wire connection portion comprises bus bars.

5. The lamp unit according to claim 2, wherein a switching unit for activating and deactivating the illumination member is provided at the lower surface.

* * * * *